(12) United States Patent
Ohmura et al.

(10) Patent No.: US 6,551,721 B1
(45) Date of Patent: Apr. 22, 2003

(54) SURFACE-TREATED STEEL SHEET FOR BATTERY CASE, BATTERY CASE COMPRISING THE SAME, METHODS FOR PRODUCING THEM, AND BATTERY

(75) Inventors: Hitoshi Ohmura, Ymaguchi-ken (JP); Tatsuo Tomomori, Ymaguchi-ken (JP); Hideo Ohmura, Ymaguchi-ken (JP); Tatsuya Ohshima, Ymaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/744,649

(22) PCT Filed: May 27, 1999

(86) PCT No.: PCT/JP99/02795

§ 371 (c)(1),
(2), (4) Date: Apr. 23, 2001

(87) PCT Pub. No.: WO00/74155

PCT Pub. Date: Dec. 7, 2000

(51) Int. Cl.[7] ............................ H01M 2/02; C25D 5/12; C25D 5/50
(52) U.S. Cl. .................. 428/679; 148/518; 148/530; 148/537; 427/383.7; 205/228; 429/163; 429/176
(58) Field of Search ................................ 428/680, 610, 428/679; 148/530, 537, 518; 427/383.7; 205/228; 429/163, 176

(56) References Cited

U.S. PATENT DOCUMENTS

| | | | | |
|---|---|---|---|---|
| 2,357,126 A | * | 8/1944 | Nachtman | 204/28 |
| 2,428,033 A | * | 9/1947 | Nachtman | 204/37 |
| 3,671,207 A | * | 6/1972 | Lynch et al. | 420/442 |
| 4,354,915 A | * | 10/1982 | Stachurski et al. | 204/242 |
| 4,600,609 A | * | 7/1986 | Leever et al. | 106/1.22 |
| 5,587,248 A | * | 12/1996 | Ohmura et al. | 428/610 |
| 5,792,553 A | * | 8/1998 | Moriyama et al. | 428/323 |
| 5,993,994 A | * | 11/1999 | Ohmura et al. | 428/648 |

FOREIGN PATENT DOCUMENTS

JP   03-187133   *   8/1991

OTHER PUBLICATIONS

Abstract, Hirofumi, JP 9306439, "Battery Can Forming Material, Battery Can Forming Method and Battery Can", (Nov. 1997).
Abstract, Hirofumi, JP 10092395, "Battery Can Forming Material and Manufacture Thereof", (Apr. 1998).
Abstract, Hirofumi, JP 7057717, "Metallic Material Plate, Negative Terminal Plate made of the Metallic Material Plate, and Manufacture of the Terminal Plate", (Mar. 1995).
Abstract, Katsuhei et al., JP 6278245 "Low Luster Black Steel Plate and Manufacture Thereof", (Oct. 1994).
Abstract, Osamu, JP 10142743, "Photographic Film Cartridge", (May 1998).
Abstract, Kenji et al., JP 8287885, "Coated Metallic Plate for Alkaline Dry Cell Positive Electrode Can", (Nov. 1996).
Abstract, Teiji et al., JP 10012199, "Alkaline Battery", (Jan. 1998).

* cited by examiner

Primary Examiner—John J. Zimmerman
(74) Attorney, Agent, or Firm—Browdy and Neimark, P.L.L.C.

(57) ABSTRACT

A purpose of the present invention is to provide a surface treated steel sheet for a battery container having an excellent anti-alkaline characteristic and a performance for maintaining a discharging level for a long time, a battery container and a product method thereof. In the present invention, after forming a nickel-bismuth alloy layer on a steel sheet, the steel sheet is thermally treated at 300° C. to 650° C. in an inactive gas or a deoxidizing gas for 240 to 600 min so that an iron-nickel diffused layer and nickel-bismuth diffused layer are formed at each boundary surface. A battery is produced by utilizing a battery container made of a steel sheet on which one or more than layers selected from a group of an iron-nickel diffused layer, a nickel layer, a nickel-bismuth diffused layer, an iron-nickel-bismuth alloy layer is formed on the steel sheet.

6 Claims, No Drawings

SURFACE-TREATED STEEL SHEET FOR BATTERY CASE, BATTERY CASE COMPRISING THE SAME, METHODS FOR PRODUCING THEM, AND BATTERY

The present application is the national stage under 35 U.S.C. 371 of PCT/JP99/02795, filed May 27, 1999.

INDUSTRIAL FIELD

The present invention relates to a surface treated steel sheet used for an electric battery container, particularly to a surface treated steel sheet used for a container of a first battery such as an alkaline battery or a manganese battery, a battery container with the surface treated steel sheet and a battery.

BACKGROUND OF THE INVENTION

Recently, performance of handy-carrier home electric products has been remarkably improved. Regarding a battery used for such products, it is required high grade and high performance. In a conventional art, in the case that a steel sheet is used for a container of the above described battery, a nickel plating steel sheet has been press-formed or a cold rolled steel sheet press-formed has been plated with nickel which has a good adhesive characteristic with respect to be adhesive to a surface of the steel sheet.

In order to improve a battery performance, an adhesive characteristic between an inner surface of a container and positive electrode active material is strengthened. Simultaneously, in order to enlarge an area of the inner peripheral surface of the container, it has been recommended various methods for reducing internal resistance of the container after finishing a step of forming a hard plating layer made from nickel-phosphorous alloy or nickel-tin alloy and so on.

In such a case, although the nickel-tin alloy is superior in view of reducing the internal resistance, there is a drawback. That is, a discharging characteristic is deteriorated while the alloy layer is contacted with alkaline liquid for a long time.

If it is selected and used metal or alloy having a good adhesive characteristic with respect to a steel container and positive electrode active material and of which degree is comparable to the nickel-tin alloy and a good discharging characteristic which is not deteriorated while the metal or alloy is contacted with alkaline liquid for a long time, the above drawbacks would be resolved and a life-span of such a battery would be extended.

DISCLOSURE OF THE INVENTION

A present invention is developed by utilizing a feature that Bismuth metal has an excellent anti-alkaline characteristic so that compounds of a plating layer is not solved even if the bismuth metal is contacted with alkaline solution for a long time and another feature that the metal is apt to be diffused so that an alloy layer can be formed easily. According to these features, it can be accomplished to provide a battery of which the discharging characteristic is not deteriorated for a long time by employing metal including bismuth metal as an inner surface of a battery container.

In order to accomplish the above purpose, a method according to the present invention is characterized in that a surface treated steel sheet for a battery container in which a nickel-bismuth alloy layer is formed on at least one surface of the steel sheet and the alloy layer is formed by an electrolyte plating method and an inner surface of the battery container is made of metal combined by a steel sheet for a battery container and a steel sheet in which the nickel-bismuth alloy layer is diffused. If a steel sheet made of only bismuth metal is used, the layer is apt to be peeled. Once the layer begins being peeled, the inner nickel layer contacts with alkaline solution directly. Such a phenomenon is unlikely.

By using such a steel sheet including a diffused alloy layer, an adhesive characteristic between a steel sheet used for a container and the alloy layer becomes proper and the discharging characteristic is not deteriorated since a solved amount of the alloy contacted with alkaline solution is remarkably less even if the alloy contacts with the alkaline solution for a long time.

BEST MODE FOR CARRYING OUT THE INVENTION

Hereinafter, each embodiment of the present invention will be described in order.

(1) Steel sheet

When a battery according to the present invention is manufactured, a mild steel sheet should be prepared. Regarding the mild steel sheet, it is preferable that a cold rolling low carbon aluminum killed steel, an extremely low carbon steel sheet of which carbon content is equal or less than 0.003% and a non-aging extremely low carbon steel sheet in which niobium, boron and titanium are added. A reason why these mild steel sheets are used is an easy ironing process in accordance with the following steps. It is preferably that a thickness of the used steel sheet is about from 0.10 mm to 0.40 mm. Since it becomes easier to form a can in accordance with the following DI method (drawing and ironing) or the following DTR method (drawing thin and redraw).

(2) Nickel-Bismuth alloy plating

In order to form a nickel-bismuth alloy plating layer, it may employ a method in which nickel plating is firstly treated as a strike plating and then bismuth plating is treated so as to form the alloy. Alternatively, another method in which the nickel plating is firstly treated as strike plating and then nickel-bismuth alloy plating is treated thereon may be employed. Further, it may be employed another method in which nickel-bismuth alloy plating is treated without treating strike plating.

Regarding a nickel plating method, it may be employed a conventional non-electrolyte plating method or an electrolytic plating method. Further, regarding the electrolytic plating methods, a conventional watt bath, a sulfamin acid bath, a boric fluoride bath and so on can be employed as a plating bath. A thickness of nickel plating is preferably from 1 $\mu$m to 10 $\mu$m. The nickel plating is treated so as to improve an adhesive characteristic with respect to the following bismuth plating. The thickness is preferably equal or less than 10 $\mu$m. If the thickness is less than 1 $\mu$m, it would be difficult to form a diffused layer operated in the following treatment steps.

Bismuth plating may be treated in any conventional plating bath such as a perchloric acid bath, a pyrophosphoric acid bath, citric acid bath, a metasulfonic acid bath, a chloride Bismuth bath since basic components of the bathes are suitable for a purpose of the invention. In general, if organic components are added to a bath, a strict bath control is required so that a cost is apt to become higher. However, in the case of forming an extreme thin plating layer according to the present invention, the above drawbacks do not become so serious.

In a chloride bath, components thereof are only Bismuth chloride of 80 to 120 g/L, sodium chloride of 15 to 20 g/L and hydrochloric acid of about 200 ml/L. Although the components are very simple, processing steps are very complicated. For example, it is necessary to actuate a polar cycle in which a cathode is used for 10.5 seconds and the an anode is used for 5 seconds alternatively. In the case of providing a nickel strike plating layer, the nickel layer is solved when the plating layer is immersed in the bath so that the plating layer has to be immersed into the bath only for an anode cycle.

In the case of the metasulfonic acid bath, basic bath components are metasulfonic acid and bismuth oxide solved therein in which $Bi^{3+}$ is finally 20 g/L and a free acid density is 2N. Further, diffusing agent and gloss agent are selectively added. For example, polyethylene glycol nonyl-phenyl-ether may be used as the diffusing agent and amine-aldehyde system solution of 20% may be used as the gloss agent. A reason why the gloss agent is added is to avoid for powdering a surface of a plating layer. If the gloss agent is included, a cathode potential is apt to be shifted to a potential level at which hydrogen is produced so that crystal of the surface of the plating layer can become finer. In order to obtain the most suitable effect, a ratio of the gloss agent with respect to the diffusing agent is within a range of 1 to 1.5. If the gloss agent or the diffusing agent is used solely, the above effect can not be obtained. A temperature of the bath is preferably from 20 to 25° C. and an current density is preferably from 2 to 5 $A/dm^2$. In the case of this type bath, a thickness of the bismuth plating layer is preferably from 0.01 to 1.0 $\mu$m in general. The thickness of the plating layer can be controlled by adjusting a plating time. In the case of forming a plating layer on a steel sheet, nickel plating is treated on the both surfaces of the steel sheet as strike plating. In accordance with a purpose of the respective products, it may be selected one method for treating bismuth plating on an inner surface of the steel sheet or another method for treating bismuth plating on the both surfaces of the steel sheet.

(3) Formation of A Diffused Layer

A formation of the diffused layer is thermally treated. In the case of plating a nickel layer and a bismuth layer at two steps, a purpose of the thermal treatment is to form a nickel-bismuth alloy layer. By providing a diffused layer between iron material of a steel sheet and the nickel-bismuth alloy layer, the plating layer is not apt to be peeled easily while the steel sheet is processed and an inner resistance of an inner surface of a battery container can be reduced.

A thermal treatment is preferably treated in deoxidized/reduced protect gas in view of preventing an oxide film from forming on a surface of the alloy layer. Regarding the deoxidizing gas, so called inactive gas such as nitrogen, argon and neon is utilized. On the other hand, regarding the reduced gas, hydrogen, ammonia gas are suitably utilized.

Regarding the thermal treatment, there are a box-type annealing method and a continuous annealing method. Any methods may be selectable. It is preferable that a temperature of the thermal treatment is equal or more than 300° C. and a treating time is from 30 seconds to 10 hours. However, a condition of the thermal treatment is depending on a kind of a steel sheet. For example, if an extreme low carbon steel sheet of which carbon content is equal or less than 0.003 wt % is used, the temperature must be a constant temperature and the treating time must be a short time since a re-crystallization temperature of the steel sheet is relatively high.

(4) A formation of a Battery container

A battery container is formed by the DI (drawing and ironing) method or the DTR (drawing thin and redraw) method. In the case of the DI method, a thin steel sheet of which a surface is the nickel-bismuth alloy including the above described components is formed. A diameter of the battery container is slightly larger than an outer diameter of the battery container and a shallow drawing cup is prepared. The thin steel sheet is processed through a plurality of multi-step drawing dies coaxially arranged so as to decrease a drawing diameter in order. The steel sheet is continuously processed without occurring draw-down by pressurizing with a punch having a round corner at a front end.

In the case of the DTR method, as similar as the DI method, a shallow drawing cup must be prepared so as to draw the cup again. In the next step, a new drawing cup of which a diameter is smaller than the former drawing cup and a height is higher than the former drawing cup is prepared. Then, a high grade drawing cup is processed in order. In the re-drawing process, the cup is held by a ring-shaped pressing member inserted into the cup and a re-drawing die located under the cup. A re-drawing punch which is coaxially arranged with respect to the die is reciprocated in the pressing member. Re-drawing punches having different diameters are successively used in order. If necessary, other methods for producing a battery container can be employed.

(5) Manufacture of Alkaline Manganese Battery

Positive electrode active material of an alkaline manganese battery is produced by mixing manganese dioxide, carbon powder and alkaline solution. The manganese dioxide is an origin of an oxidation component so that it is required high activity and high purity. It is preferably to use electrolyte manganese dioxide in which $MnO_2$ of equal or more than 91% is included.

Regarding characteristics of the carbon powder, it is required high purity and chemical stability, good conductivity, processability of mixed material and a characteristic for holding solution. For example, acetylene black, denatured products of carious carbon black, graphitized carbon black and synthetic graphite powder have been utilized as carbon black satisfied with the above requirements. Recently, synthetic graphite is mainly used. In the case of producing the positive electrode active material, a ratio of electrolyte dioxide manganese with respect to graphite is 5:1 to 10:1. Then, potassium hydroxide solution is added to them so as to mix the materials in accordance with a proper method.

On the other hand, in order to have a proper conductivity between a steel sheet for a battery container and the positive electrode active material, mixture of organic solvents such as graphite, thermosetting resin, methyl ethyl ketone and so on is coated on an inner surface of the battery container by a spray method and so on and then dried. The mixture is pressurized in a mold so as to form a donut-shaped positive electrode active material pellet. The pellet is attached to an inside of the battery container and pressurized. A cathode board on which a cathode collecting bar is spot-welded is attached to a battery container by neck-in processing at a predetermined location of a lower portion of an opening end of the battery container.

A purpose of a separator used for a battery is to prevent particles of negative active material and its products and particles of cathodic active material from moving mutually. Thereby, inner short circuit and self-discharging of a battery container be prevented by avoiding for producing the cathode products in the separator. Fiber material or non-woven fiber having anti-alkaline characteristic is used as the separator. Regarding the material, synthetic resin such as vinylon, polyolefin, polyamide and so on, linter pulp, mercerization wooden pulp or reproduced cellulose of which α-cellulose content is equal or more than 98% are used.

One of these kinds of fiber separator is inserted along an inner surface of the positive electrode active material pellet pressurized at the battery container. Anode gel made of potassium hydroxide that zinc grains and zinc oxide are saturated is inserted into a battery container. Regarding the zinc grains, it is preferably atomizing powder of which a diameter is about 200 $\mu$m. Regarding the gel, starch, cellulose derivative, polyacrylate and so on may be used. In the final, an insulate gasket is attached to the cathode member, inserted into the battery container, and caulked so as to manufacture an alkaline manganese battery.

EMBODIMENTS

Embodiments according to the present invention will be described in detail.

EXAMPLE 1

A steel sheet is a cold rolled steel sheet with a thickness of 0.25 mm and has been annealed and then skin-passed. Components of the steel sheet which is a plating board are carbon of 0.03 wt %, manganese of 0.21 wt %, silicone of 0.01 wt %, phosphorus of 0.01 wt %, sulfur of 0.06 wt %, aluminum of 0.035 wt % and nitrogen of 0.0024 wt %. The steel sheet is immersed into solution in which sodium hydroxide (NaOH) of 30 g/L is solved at 70° C. and alkaline electrolytic degreasing is treated at current density of 5 A/dm$^2$ for 10 seconds. After alkaline degreasing, the steel sheet is immersed in sulfuric solution of 50 g/L for 15 seconds so as to neutralize by acid cleaning. Then, while a nickel pellet attached with a polypropylene bag is affected as an anode, the steel sheet is plated by air stirring so as to form a matte nickel plating layer with a thickness of 2.2 $\mu$m in accordance with the following condition.

[Condition of nickel plating]

| Bath components | |
|---|---|
| Nickel sulfate: | 300 g/L |
| Nickel chloride: | 45 g/L |
| Boric acid: | 45 g/L |
| Pitless Agent: | 0.5 g/L |
| Bath temperature: | 58 ± 2° C. |
| pH: | 4.0 ± 0.2 |
| Current density: | 25 A/dm$^2$ |

After nickel plating, a bismuth plating layer having a thickness of 0.22 $\mu$m is formed in the following bismuth chloride bath.

[Condition of bismuth plating]

| Bath components | |
|---|---|
| Meta-sulfonic acid: | 150 g/L |
| Bismuth ($^{2+}$): | 20 g/L |
| Diffusing agent: | 10 g/L |
| Gloss agent: | 10 ml/L |
| Bath temperature: | 22 ± 2° C. |
| pH: | 0.5 |
| Current density: | 3 A/dm$^2$ |

After finishing the bismuth plating, a thermal treatment is operated by a box type annealing furnace at 300° C. for 300 minutes so as to denature the nickel-bismuth plating layer to a nickel-bismuth alloy layer. In such a case, atmosphere gas is hydrogen of 6% and the other is nitrogen gas and a dew-point temperature is −45° C.

Upon reviewing a cross sectional view of a test material after finishing a step of the thermal treatment, a thickness of a nickel layer is 0.24 $\mu$m. Although an iron-nickel diffused layer and triple diffused layers of nickel, bismuth and iron have not been formed, it can be recognized that the nickel-bismuth diffused layer with a thickness of 1.90 $\mu$m is formed. A thickness of a nickel-bismuth plating layer, a thermal treatment condition and a judgement condition of a cross sectional view of a steel sheet after finishing a step of the thermal treatment (thickness of the diffused layer and so on) are shown in Table 1.

A battery container is made of a plated steel sheet in accordance with the DI method. After cupping a blank diameter of 41 mm of the thermal treated steel sheet with a thickness of 0.25 mm to a diameter of 20.5 mm, re-drawing and two step drawing are operated in a DI machine so as to form a container of which an outer diameter is 13.8 mm, a thickness is 0.20 mm and a height is 56 mm. In the final, trimming is operated with respect to an upper portion of the battery so as to produce a LR-6 type battery container with a height of 49.3 mm. Positive electrode active material is filled into the battery container. A performance of a manufactured battery is measured.

Manganese dioxide and graphite in which a ratio of manganese dioxide with respect to graphite is 10:1 are collected and mixed with potassium hydroxide of 8 ml so as to produce positive electrode active material. On the other hand, mixture of graphite of 80 wt % and thermosetting epoxy resin of 20 wt % are diluted with methyl ethyl ketone.

The dilution liquid is sprayed on an inner surface of a battery container and then dried at 150° C. for 15 min. The positive electrode active material is pressurized in a mold so as to form a donut-shaped mixture material pellet. The pellet is inserted into an inside of a battery container and pressurized. A cathode board on which a cathode collecting bar is spot-welded is attached to a battery container by neck-in processing at a predetermined location of a lower portion of an opening end of the battery container.

In the next, a separator made of vinylon unwoven fiber is inserted along an inner peripheral surface attached to the battery container. Further, anode gel made from potassium hydroxide saturated by zinc grains and zinc oxide is inserted into the battery container. Further, an insulate gasket is attached to the cathode member and inserted into the battery container. Finally, an alkaline manganese battery is furnished by caulking. The furnished alkaline manganese battery is maintained at 60° C. for 20 days. An inner resistance, a short circuit current and 2 Ω continuous discharging time (min) are measured and the result thereof is shown in Table 3.

EXAMPLES 2~6

A steel sheet having the same quality and the same thickness of the example 1 is used. As similar as the example 1, mutt nickel plating is processed. Then, bismuth plating is processed. In such a case, a thickness of a plating layer is controlled by adjusting a plating time. After finishing the bismuth plating, the steel sheet is operated in a box type annealing furnace in the same atmosphere of the example 1. A thermal treatment is processed for 480 min wherein a heating temperature is varied in a range of 450° C. to 600° C. Regarding a steel sheet after finishing a step of plating and a steel sheet after finishing a step of the thermal treatment, characteristics are measured and shown in Table 1. As similar as the example 1, an alkaline manganese battery is manufactured by using the thermal treated steel sheet. Battery characteristics thereof are shown in Table 3.

COMPARATIVE EXAMPLES 1 TO 4

A steel sheet having the same quality and the same thickness of the example 1 is used. Characteristics of the steel sheet which is only nickel plated are shown in Table 2. Battery characteristics made of the steel sheet are shown in Table 3. Comparative examples 1 and 2 show samples without thermal treatment and comparative example 3 and 4 show samples with thermal treatment. The comparative example 3 is thermally treated at 500° C. for 300 min. The comparative example 4 is thermally treated at 600° C. for 480 min. Characteristics and a cross sectional condition of a steel sheets after finishing a step of plating and steel sheets after finishing a step of thermal treatment are shown in Table 2. As similar as the example 1, an alkaline manganese battery is made of the surface treated steel sheet. A respective inner resistance and so on of the alkaline manganese batteries are shown in Table 3.

Characteristics of the respective steel sheet and the respective battery of the embodiments and the comparisons are measured by the following method.
(1) Thickness of a diffused layer
 The thickness is measured by a GDS analysis method.
(2) Inner Resistance
 A voltage meter is connected to a manufactured battery so as to make a closed circuit. Immediately, a voltage is measured and the measured voltage is designated as an inner resistance.
(3) Short circuit current
 After maintaining the manufactured battery at 60° C. for 20 days, a current meter is connected to the manufactured battery so as to make a closed circuit. A current value of the battery is measured and the measured value is designated as a short circuit current. The characteristics of the battery after maintaining at 60° C. for 20 days would be similar to characteristics of a battery sold in the market.
(4) Continuous discharging time
 A closed circuit is formed by connecting the manufactured battery and a resistance of 2 Ω. It is measured a time until a voltage becomes 0.9 V.

POSSIBILITY OF USE IN INDUSTRY

As clearly shown in Table 3, an alkaline manganese battery in which a steel sheet with a nickel-bismuth diffused layer is used as a positive board has an inner resistance smaller than that of a conventional alkaline manganese battery in which a mutt nickel plated steel sheet, that is, a typically polar board of a battery sold in the market is used. The alkaline manganese battery according to the present invention is excellent in view of short circuit current. Regarding the continuous discharging time, it can be found a clear difference distinguishable from the conventional alkaline manganese battery.

TABLE 1

THICKNESS OF PLATING LAYER, THERMAL TREATMENT CONDITION AND CROSS SECTIONAL CONDITION OF STEEL SHEET AFTER THERMAL TREATMENT

| | | Thickness of plating | | Thermal treatment condition | | Cross sectional condition of steel sheet after thermal treatment | | | |
|---|---|---|---|---|---|---|---|---|---|
| Example | Kind of plating | Nickel layer (μm) | Bismuth layer (μm) | Soaking temperature (° C.) | Soaking time (min) | Diffused layer of Fe-Nickel (μm) | Nickel layer (μm) | Diffused layer of Nickel-Bismuth (μm) | Alloy layer of Nickel-Bismuth-Fe (μm) |
| Example 1 | Ni + Bi | 2.2 | 0.22 | 300 | 300 | — | 0.24 | 1.90 | — |
| Example 2 | Ni + Bi | 1.9 | 0.01 | 450 | 480 | 0.14 | 1.80 | 0.02 | — |
| Example 3 | Ni + Bi | 2.0 | 0.04 | 500 | 480 | 1.65 | 1.90 | 0.07 | — |

TABLE 1-continued

THICKNESS OF PLATING LAYER, THERMAL TREATMENT CONDITION AND CROSS SECTIONAL CONDITION OF STEEL SHEET AFTER THERMAL TREATMENT

| | | Thickness of plating | | Thermal treatment condition | | Cross sectional condition of steel sheet after thermal treatment | | | |
|---|---|---|---|---|---|---|---|---|---|
| Example | Kind of plating | Nickel layer ($\mu$m) | Bismuth layer ($\mu$m) | Soaking temperature (° C.) | Soaking time (min) | Diffused layer of Fe-Nickel ($\mu$m) | Nickel layer ($\mu$m) | Diffused layer of Nickel-Bismuth ($\mu$m) | Alloy layer of Nickel-Bismuth-Fe ($\mu$m) |
| Example 4 | Ni + Bi | 0.5 | 0.11 | 550 | 480 | 0.65 | — | 0.65 | 0.10 |
| Example 5 | Ni + Bi | 2.2 | 0.50 | 550 | 480 | 2.30 | — | 0.82 | 0.02 |
| Example 6 | Ni + Bi | 1.2 | 0.02 | 600 | 480 | 5.90 | — | 0.01 | 0.01 |

TABLE 2

THICKNESS OF PLATING LAYER, THERMAL TREATMENT CONDITION AND CROSS SECTIONAL CONDITION OF STEEL SHEET AFTER THERMAL TREATMENT

| | | Thickness of plating | Thermal treatment condition | | Cross sectional condition of steel sheet after thermal treatment | |
|---|---|---|---|---|---|---|
| Comparative Example | Kind of plating | Nickel layer ($\mu$m) | Soaking temperature (° C.) | Soaking time (min) | Diffused layer of Fe-Nickel ($\mu$m) | Nickel layer ($\mu$m) |
| Comparative Example 1 | Ni | 1.1 | — | — | — | 1.0 |
| Comparative Example 2 | Ni | 2.0 | — | — | — | 2.0 |
| Comparative Example 3 | Ni | 1.0 | 500 | 300 | 1.6 | 0.4 |
| Comparative Example 4 | Ni | 2.1 | 600 | 480 | 5.4 | — |

TABLE 3

CHARACTERISTIC OF BATTERY

| | Characteristics of battery | | |
|---|---|---|---|
| Example or Comparative Example | Inner resistance (m Ω) | Short circuit current (A) | Discharging time (min.) |
| Example 1 | 101 | 10.5 | 114 |
| Example 2 | 107 | 8.7 | 104 |
| Example 3 | 103 | 9.7 | 115 |
| Example 4 | 97 | 10.3 | 116 |
| Example 5 | 95 | 12.4 | 121 |
| Example 6 | 104 | 8.9 | 112 |
| Comparative example 1 | 129 | 8.1 | 87 |
| Comparative example 1 | 129 | 8.2 | 89 |
| Comparative example 1 | 134 | 7.4 | 90 |
| Comparative example 1 | 137 | 7.1 | 83 |

What is claimed is:

1. A surface treated steel sheet for a battery container wherein a nickel-bismuth alloy layer is formed on at least one surface of said surface treated steel sheet, said surface treated steel sheet characterized in that said nickel-bismuth alloy layer is a diffused layer.

2. A surface treated steel sheet for a battery container as claimed in claim 1, wherein said nickel-bismuth alloy layer is formed by an electrolytic plating method.

3. A battery container comprising a steel sheet defining an inner surface of the battery container, wherein a nickel-bismuth alloy layer is formed on the inner surface of said battery container, said surface treated steel sheet characterized in that said nickel-bismuth alloy layer is a diffused layer.

4. A surface treated steel sheet for a battery container, said surface treated steel sheet characterized in that an iron-nickel diffused layer is formed at a side of said steel sheet adapted to become an inner side of the battery container, and a nickel layer is formed at an inner side of the diffused layer.

5. A method for producing a steel sheet for a battery container, said method is characterized in that a nickel-bismuth alloy layer is formed on said steel sheet and thermally treated at 300 to 650° C. in an atmosphere of inactive gas or dioxide gas for 240 to 600 min so as to form an iron-nickel diffused layer and a nickel-bismuth diffused layer at each boundary portion.

6. A battery including a container made of a steel sheet wherein one or more than one layer selected from the group consisting of a nickel-bismuth diffused layer and an iron-nickel-bismuth alloy layer is formed on said steel sheet.

* * * * *